United States Patent [19]

Müller

[11] Patent Number: 4,809,932
[45] Date of Patent: Mar. 7, 1989

[54] THRUST VECTOR CONTROL FOR AIRCRAFT

[75] Inventor: Werner Müller, Puttenhofen, Fed. Rep. of Germany

[73] Assignee: Messerschmitt-Bökow-Blohm GmbH, Munich, Fed. Rep. of Germany

[21] Appl. No.: 134,364

[22] Filed: Dec. 17, 1987

[30] Foreign Application Priority Data

Dec. 20, 1986 [DE] Fed. Rep. of Germany ....... 3643823

[51] Int. Cl.$^4$ .................................................. B64C 15/00
[52] U.S. Cl. .................................................. 244/52
[58] Field of Search ........................ 244/52, 23 D, 12.5; 60/228, 230, 232, 39.32; 239/265.35; 415/134, 135, 137

[56] References Cited

U.S. PATENT DOCUMENTS

| | | | |
|---|---|---|---|
| 2,402,418 | 6/1946 | Kroon | 415/137 |
| 2,686,655 | 8/1954 | Schorner | 60/39.32 |
| 2,813,396 | 11/1957 | Kress | 60/39.32 |
| 3,024,604 | 3/1962 | Morley | 60/39.32 |
| 3,281,082 | 10/1966 | Kerry | 244/52 |
| 3,912,202 | 10/1975 | Jenkins | 244/52 |
| 4,643,374 | 2/1987 | Friederich | 244/52 |

FOREIGN PATENT DOCUMENTS 888943 2/1962 United Kingdom ................. 244/52

Primary Examiner—Galen Barefoot
Assistant Examiner—Rodney Corl
Attorney, Agent, or Firm—Kenyon & Kenyon

[57] ABSTRACT

The invention is directed to a thrust vector control for aircraft with one or more jet engines whose thrust nozzles have an adjustable size exist cross-section, each of the jet engines having a ring rudder axially spaced behind the engine and movable about at least one pivot axis extending substantially perpendicular to the engine's longitudinal axis. A substantially planar rudder plate is secured diagonally in the inside cross-section of the ring rudder for each plane defined by each pivot axis and the longitudinal axis of the engine. The rudder plate or plates each consist of a material which is stable at high temperatures without supplementary cooling and which is mechanically loadable, and the connection between the rudder plate or plates and the ring rudder each include a layer of elastic and thermo-insulating material.

4 Claims, 2 Drawing Sheets

THRUST VECTOR CONTROL FOR AIRCRAFT

BACKGROUND OF THE INVENTION

The invention relates to a thrust vector control for aircraft with one or more jet engines with each of the jet engines having a hrust nozzle with an at least approximately round, size-adjustable exit cross-section. More specifically, the invention is directed to high-performance fighter planes having a ring rudder arranged in an axially spaced position rearwardly of each jet engine and movable about at least one pivot axis extending substantially perpendicular to the longitudinal axis of the engine.

Based on currently applicable military principles, modern fighter or pursuit airplanes must meet requirements, in particular with regard to flight properties, which cannot be fulfilled with conventional technical solutions or only insufficiently so. These requirements include, among other things, the requirement of great maneuverability at extreme low flying speeds. Due to a low aproach velocity and unfavorable approach direction (i.e., a high angle of incidence), the effectiveness of control surfaces approached aerodynamically, i.e., by ambient air, is very low or no longer exists. The only meaningful alternative is, as a rule, a controlled deflection of the high-energy engine exhaust jet, of which VTOL aircraft are a particularly noteworthy example. But here, too, difficulties may arise, as for example, material problems due to the high exhaust temperature (to about 2000~K.), problems of strength and vibration due to the high flow velocities, negative effects on the engine throughput (m) due to backpressure effects, etc.

To avoid temperature problems, it is customary to provide a ring rudder having a cross-section which is larger in diameter than the diameter of the assooiated jet engine. The ring rudder is spaced axially behind the engine nozzle to envelope the exhaust jet with a cooling jacket of ambient air sucked in by an ejector effect. The cooling jacket of ambient air causes the rudder structure to remain at a relatively low temperature (max. about 300~C.). The cross-sectional form of the ring rudder is adapted to the nozzle form and is usually round or rectangular. Such an arrangement is shown, for example, in FIGS. 4 to 6 of DE-AS No. 11 00 385. The jet deflection reponse of such ejector ring rudders involves socalled dead zones, i.e., the rudder must first be deflected out by a certain angle before the exhaust jet is also deflected. The magnitude of this dead angle varies according to flight conditions and it varies especially—in the case of supersonic engines with adjustable nozzles—with the momentary size of the adjustable nozzle cross-section. This rather unpredictable behavior makes sensitive control and regulation practically impossible, thus ruling out utilization in high-performance aircraft. Alternatively the ring rudder could be made so small that it always lies at or in the nozzle jet. However, such a small-sized rudder and, possibly, also parts of the suspension and actuation mechanism would be continuously exposed to the high exhaust temperatures, to the detriment of useful life and reliability.

DE-OS No. 34 20 441 illustrates a jet control wherein a rudder cross with movable flaps (11 to 14) is arranged in an engine nozzle of fixed diameter. Upon failure or ineffectiveness of the aerodynamic rudders (4 to 8) the rudder cross permits movement about the pitch, yaw and roll axes, thereby increasing flight safety. The flaps (11 to 14) are preferably arranged so that they do not lie in the hottest core (17) of the exhaust jet. Yet the flaps and parts of their suspension are exposed to relatively high temperatures.

Tests have shown that while with plate or wing type rudders there is no occurrence of a dead angle effect in or behind the engine nozzle, only a relatively slight jet deflection (max. about 20~) is possible. This may suffice to increase flight safety, but does not provide a decisive improvement in the maneuverability of the aircraft.

SUMMARY OF THE INVENTION

It is, therefore, a primary object of the invention to provide a thrust vector control for aircraft having adjustable nozzles which is structurally straightforward, robust with a long work life, and which is especially effective in terms of aerodynamics. Generally, the invention comprises a ring rudder arranged in an axially spaced position rearwardly of each jet engine of the aircraft and movable about at least one pivot axis extending substantially perpendicular to the longitudinal axis of the jet engine and wherein a substantially planer rudder plate is secured within the cross section of the ring rudder, which rudder plate extends within a plane defined by the pivot axis and the longitudinal axis. The rudder plate is made from a material which is stable at high temperatures.

The invention, therefore, combines a known ring rudder operating on the ejector principle with one or more rudder plates fixed therein which are oriented to coincide with orthogonal planes defined by the pivot axis and the longitudinal axis of the aircraft.

Thus, the ring rudder, including the associated bearings and actuating mechanisms, remains cool, with a positive effect on work life and reliability. Exposure to hot temperatures is limited to the central part of the rudder plates and, accordingly, the resulting problems of service life can now be solved without supplementary cooling (coated CFC).

As tests have shown, through the installation of the rudder plates of the invention, a largely linear jet deflection response without dead zones is achieved over the entire sphere of operation of the preceding adjustable nozzle. The contribution of the ring rudder in terms of aerodynamics is that much greater jet deflection angles can be achieved than in free-standing rudder plates.

The mechanical connection between the rudder plates with the ring rudder is designed so that unfavorable heat currents and thermostresses are largely avoided.

The invention is explained more specifically below with reference to an exemplary embodiment illustrated in the drawing. The figures show in simplified form:

DETAILED DESCRIPTION

Figure 1:
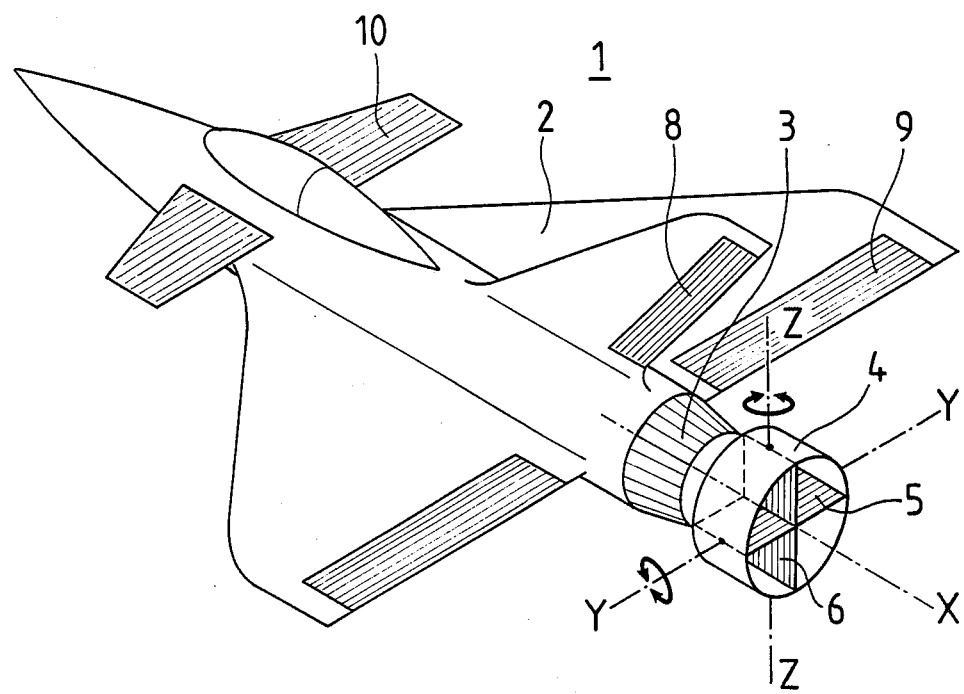
FIG. 1 is a perspective view of an aircraft including a thrust vector control according to the invention.

Referring now to the drawings and initially to FIG. 1, a thrust vector control 1 according to the invention is arranged on a single-jet pursuit or fighter plane in "duck" construction. The principles of the thrust vector control of the invention are suitable for implementation in multi-jet "duck" airplanes (e.g., EFA) and for single and multi-jet airplanes with a conventional aerodynamic layout (airfoil wing and separate tail elevator unit, delta wing without separate elevator unit). Also unmanned, jet-propelled missiles which must be especially maneuverable and quick to react (e.g., for flight extremely close to the ground) could be equipped with the thrust vector control 1.

The aircraft 2 shown in FIG. 1 comprises aerodynamic rudder surfaces 8, 9, 10 customary for such an airplane type. The rudder surfaces 8, 9, 10 may consist of several, separately operable partial surfaces (not shown). The representation of additional flap systems (e.g., at the front edge of the wing) has been dispensed with, for simplification of description.

For adaption to different modes of operation (with and without reheater, Reheat/Dry) and speed ranges, the engine is provided with a thrust nozzle 3 of adjustable diameter. A ring rudder 4 is arranged coaxially with and axially spaced from the thrust nozzle 3. The ring rudder 4 is movable about two orthogonal axes Y-Y and Z-Z and has a fixed diameter which is larger than the largest adjustable diameter of the thrust nozzle 3 to obtain an ejector effect for cooling. For greater clarity, the cardan suspension of the ring rudder 4 is not shown. It is meaningful, however, to attach the suspension to the airframe of the aircraft 2, in order to avoid static and dynamic supplementary loads on the engine and to facilitate retrofitting on existing airplane types (no engine alterations necessary). The pivot axes Y-Y, Z-Z define, together with the engine's longitudinal axis X, two orthogonal planes, in which, pursuant to the invention, two rudder plates 5 and 6 are arranged, respectively. The pivot axes and hence the rudder plates 5, 6 are parallel to the pitch and yaw axes, respectively, of the aircraft 2. It may suffice to provide a single pivot axis and hence a single rudder plate for the ring rudder 4. Such a single pivot axis may be parallel to either the pitch or yaw axis, or it may be in an oblique angle thereto (e.g. in the X-Z plane).

Figure 2:
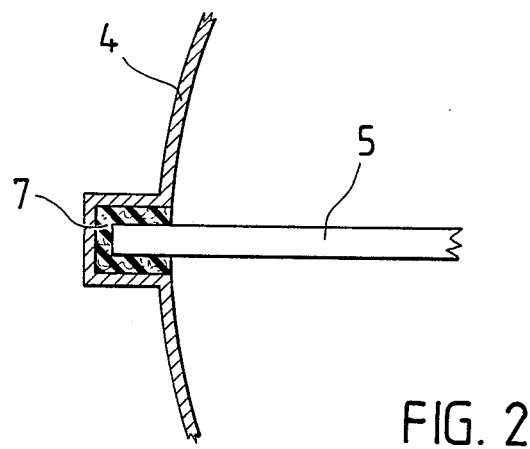
FIG. 2 is a transverse section through the point of connection between a ring rudder and a rudder plate in accordance with the invention.

FIG. 2 illustrates, in cross section, the critical point of the thrust vector control 1. This is the point of connection of the rudder plates 5 or 6 with the ring rudder 4. Because of the extremely different thermal stress (ring rudder max. temperature is about 300~C., rudder plate max. temperature is about 1700~C.), it is advisable to make the structural parts 4, and 5 and 6 of different materials. Steel, titanium, or carbon fiber-reinforced plastic have been found to be suitable for the ring rudder 4. As a practical matter, ceramically coated, carbon fiber-reinforced carbon is the only material which is, at present, feasible for use in the rudder plates 5, 6 without the need for supplementary cooling. As a result of the great temperature difference and possibly greatly different coefficients of heat expansion (in particular for steel/CFC), rather great relative geometric displacements may occur at the points of connection. To avoid unduly high tensions in the material, the ring rudder 4 is formed so that it encloses the ends of the rudder plates 5, 6 in a box-like structure spaced from the rudder plates 5, 6 by a predetermined distance. Force transmission between the rudder plates 5, 6 and the ring rudder 4 is by a rubber-elastic and thermo-insulating intermediate layer 7 arranged within the box-like structure between the plate 5, 6 and the ring rudder 4. The layer comprises a material such as silicone rubber, in which, for better heat removal and with a view to higher strength, other components such as fibers of any kind, metal particles, carbon particles, etc. may be embedded. As it is expected that the rudder plates 5, 6 would have a shorter life than the ring rudder 4, it is meaningful to design the former so that they are easy to replace. This is easy to achieve in that the box-like concavities of the ring rudder 4 are made removable, with the provision, for reasons of strength, that the ring rudder 4 should be axially longer than the rudder plates 5, 6, so that it still forms a closed ring in the region of its front and rear edges.

Figure 3:
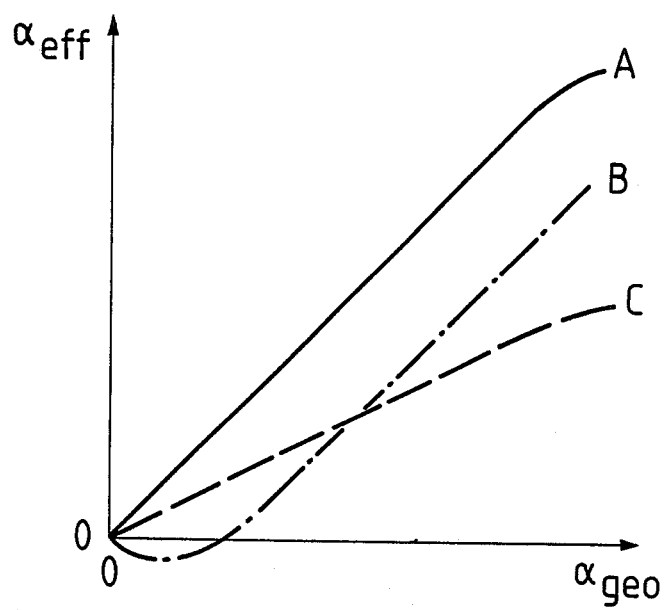
FIG. 3 illustrates a diagram showing the qualitative curve of the jet deflection angle as a function of the angular deflection of the rudder for the design according to the invention and for two designs according to prior art.

FIG. 3 clearly shows the improvements which are achieved with the thrust vector control according to the invention as compared with prior art designs. In the diagram, the qualitative response of the jet deflection angle $alpha_{eff}$ as a function of the angular deflection $alpha_{geo}$ of the rudder is shown. Curve A applies to the invention, that is, for a ring rudder with integrated rudder plates 5, 6, curve B illustrates a ring rudder without rudder plates, and curve C applies to a free-standing rudder plate. It becomes clear that with solution A at a give angular deflection $alpha_{geo}$ the greatest jet deflection $alpha_{eff}$ is obtainable, i.e., A has by far the best efficiency. The slope of each of curves A and C is largely linear; this is important for smooth control and regulation of the arrangement. Curve B has a "dead zone" or "dead angle", i.e., the rudder must first be pivoted by a certain angle before jet deflection takes place. This "dead angle" changes in particular as a function of the respective thrust nozzle diameter that has been set. Such nonlinear processes, however, make it practically impossible to perform as a sensitive control.

Hence, with a comparable linear characteristic as a free-standing rudder flap (curve C), the solution according to the invention has a clearly higher efficiency ($alpha_{eff}$).

What is claimed is:

1. A thrust vector control for an aircraft having at least one jet engine including a thrust nozzle having an at least approximately round, adjustable size exit cross-section, which thrust vector control comprises
   (a) a ring rudder arranged in an axially spaced relation rearwardly of said jet engine and movable about at least one pivot axis extending substantially perpendicular to the longitudinal axis of said jet engine,
   (b) a substantially plane rudder plate secured by said ring rudder within the cross section of said ring rudder and extending within a plane defined by said at least one pivot axis and said longitudinal axis,
   (c) said rudder plate being made of a material stable at high temperatures and suitable for application of a mechanical load, and
   (d) a layer of elastic and thermo-insulating material arranged between said rudder plate and said ring rudder.

2. The thrust vector control according to claim 1, wherein the plane of said rudder plate is parallel to one of the pitch or yaw axes of the aircraft.

3. The thrust vector control according to either of claims 1 or 2, wherein (a) said rudder plate is made of carbon fiber reinforced carbon (CFC), and includes a ceramic layer sprayed on thermally for protection against oxidation, and (b) said layer of elastic and thermo-insulating material comprises a silicone rubber-based elastic, insulating and thermostable material.

4. The thrust vector control according either of claims 1 or 2, wherein
   (a) said aircraft includes an airframe and
   (b) a suspension structure is arranged between said ring rudder and the airframe of said aircraft.

* * * * *